Patented Aug. 24, 1954

2,687,403

UNITED STATES PATENT OFFICE 2,687,403

UNSATURATED N-SUBSTITUTED AMIDES OF TERTIARY ALKYL SUBSTITUTED AROMATIC ACIDS AND POLYMERS THEREOF

Seaver A. Ballard, Orinda, Rupert C. Morris, Berkeley, and Vernon W. Buls, Walnut Creek, Calif., assignors to Shell Development Company, Emeryville, Calif., a corporation of Delaware No Drawing. Application April 14, 1951, Serial No. 221,134

14 Claims. (Cl. 260—85.5)

This invention relates to a new class of nitrogen-containing organic compounds. More particularly, the invention relates to novel unsaturated N-substituted amides of tertiary alkyl substituted aromatic acids and polymers thereof, and to their utilization, particularly in the preparation of herbicidal and fungicidal compositions and improved resinous compositions.

Specifically, the invention provides new and particularly useful N-alkenyl and/or N-carbalkenoxy substituted amides of aromatic carboxylic acids having at least one of their ring carbon atoms joined to a tertiary carbon atom of an alkyl radical. The invention further provides polymers of the aforedescribed N-substituted amides containing an unsaturated linkage in their molecule obtained by polymerizing the said amides with themselves or other polymerizable unsaturated organic compounds. The invention also provides useful compositions containing the novel N-substituted amides and polymers thereof.

It is an object of the invention to provide a new class of nitrogen-containing organic compounds. It is a further object to provide unsaturated N-substituted amides of tertiary alkyl substituted aromatic acids and a method for their preparation. It is a further object to provide a new class of nitrogen-containing organic compounds possessing unique properties which make them particularly useful and valuable in industry. It is a further object to provide unsaturated N-substituted amides of tertiary alkyl aromatic acids which are valuable in the preparation of insecticidal, herbicidal and/or fungicidal compositions. It is a further object to provide unsaturated amides of tertiary alkyl substituted aromatic acids which may be polymerized to produce resins having excellent pesticidal properties. It is a further object to provide polymers of the above-described nitrogen-containing organic compounds, said polymers possessing outstanding properties as additives for coating and impregnating compositions. Other objects and advantages of the invention will be apparent from the following detailed description thereof.

It has now been discovered that these and other objects may be accomplished by N-alkenyl and/or N-carbalkenoxy substituted amides of aromatic carboxylic acids having at least one of their ring carbon atoms joined to a tertiary carbon atom of an alkyl radical, and polymers of these N-substituted amides containing an unsaturated linkage which are obtained by polymerizing the said amides with themselves or with other polymerizable unsaturated organic compounds. These amides have many physical and chemical properties which are surprisingly different from the properties of amides of benzoic acid or the straight chain alkyl substituted benzoic acids. These unobvious properties may be attributed to the unique atomic configuration which characterizes all of the novel amides of the present invention. As is apparent, the novel amides contain a quaternary carbon atom, i. e., carbon atom which is linked through single valence bonds to four other carbon atoms, at the junction of the aromatic ring and the alkyl side chain, and the presence of this unique structure endows the compounds with unobvious properties. The novel amides, for example, possess an unexpectedly high degree of activity toward many detrimental organisms and are extremely valuable as additives for insecticidal, herbicidal and/or fungicidal compositions. The amides are additionally valuable in these applications as they have good solubility in the various oils and modifiers used in the preparation of such compositions, and in addition, endows such compositions with increased ability to penetrate the plant structure and thus greatly increases the effectiveness of the pesticidal compositions.

The polymers of the amides containing an unsaturated polymerizable linkage are particularly valuable as they have definite pesticidal properties and are ideally suited for use in the preparation of various impregnating and coating compositions and rigid plastic articles where the resulting products must come in contact with detrimental organisms. The polymers are especially valuable as additives for surface coating compositions and particularly those containing the amide-aldehyde type resins and cellulose derivatives. They are generally compatible with this type of material to high degree and endow the resulting compositions with many improved physical properties. Films containing these polymers possess excellent hardness and strength and improved resistance to outdoor exposure. The improved properties, such as the increased hardness of the films, may be attributed directly to the presence in the amide molecule of the quaternary carbon atom at the junction of the aromatic ring and the alkyl side chain.

The novel amides of the invention are obtained by reacting a tertiary alkyl substituted aromatic carboxylic acid with the desired unsaturated amine, carbamate or thiocarbamate. The term "tertiary alkyl substituted aromatic carboxylic acid" is used throughout the specification and claims to refer to aromatic acids having an aromatic nucleus wherein one or two of the ring carbon atoms of the said nucleus is or are joined to carboxyl groups and at least one other ring carbon atom is joined to a tertiary alkyl radical. The term "tertiary alkyl" refers to alkyl radicals wherein the alpha carbon atom, i. e., the carbon atom joined to the free bond of the radical, is a tertiary carbon atom. The other portion of the alkyl side chain may, and preferably is in some cases, highly branched, i. e., some of the remaining carbon atoms may be tertiary or quaternary carbon atoms. Examples of such acids are p-tert-butylbenzoid acid, m-tert-amylbenzoic acid, p-tert-decylbenzoic acid, p-tert-tetradecylbenzoic acid, m-ethyl-p-tert-octylbenzoic acid, p-tert-butylphthalic acid, 5,6-dichloro-4-tert-butylphthalic acid, o-chloro-p-tert-decylbenzoic acid, o,m-diethyl-p-tert-hexylbenzoic acid, 4-tert-butyl-1-naphthoic acid, and 3,5-dinitro-4-tert-butylbenzoic acid.

Preferred acids are the tertiary alkyl substituted aromatic monocarboxylic acids wherein the tertiary alkyl side chain contains from 4 to 18 carbon atoms and is preferably in the para-position on the aromatic ring in relation to the carboxyl group, such as p-tert-butylbenzoic acid, p-tert-octylbenzoic acid, p-tert-tetradecylbenzoic acid, p-tert-octadecylbenzoic acid, and 2,5-dichloro-4-tert-butylbenzoic acid.

Coming under special consideration, particularly because of the outstanding pesticidal properties of the amides prepared therefrom, are the above-described tertiary alkyl substituted aromatic carboxylic acids wherein at least one and preferably two of the ring carbon atoms are joined to nitro groups. Examples of this special group of acids are 2,5-dinitro-4-tert-butylbenzoic acid, 3,5-dinitro-4-tert-octylbenzoic acid, 5-nitro-4-tert-tetradecylbenzoic acid, 3,5-nitro-4-tert-nonylbenzoic acid, 4-nitro-3,5-ditert-butylbenzoic acid, and 5-nitro-4-tert-butylphthalic acid.

Acids whose amides are specially desirable for use in preparing the novel polymeric material of the present invention are the tertiary alkyl substituted aromatic mono- and dicarboxylic acids wherein 1 or 2 of the ring carbon atoms are joined to tertiary alkyl radicals containing from 4 to 25 carbon atoms, and preferably from 6 to 20 carbon atoms, such as 3,5-ditert-butylbenzoic acid, 3,5-ditert-octylbenzoic acid, 5,6-ditert-hexylphthalic acid, 4,5-ditert-dodecylbenzoic acid, and the like.

The anhydride or acid chloride form of the above-described acids may also be used in the preparation of the novel amides of the invention.

The amines used in the preparation of the amides of the invention may be exemplified by allylamine, methallylamine, and 2-butenylamine. Preferred amines are the aliphatic primary monoamines containing from 1 to 15 carbon atoms.

Coming under special consideration, particularly because of the improved toxicity of their resulting amides as well as the fine properties of their polymers, are the amines containing a polymerizable unsaturated linkage in the radical attached to the amino nitrogen atom, such as allylamine, methallylamine, 2-butenylamine, 1,4-hexene-1-diamine, 2,4-hexadienylamine, ethallylamine, and the like. Particularly preferred are the alkenylamines containing from 3 to 12 carbon atoms.

Carbamates, thiocarbamates or dithiocarbamates or the N-substituted derivatives of these compounds may be employed in producing the novel amides of the invention. The preferred derivatives of this type may be exemplified by the formula

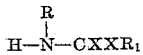

wherein R is a hydrogen or hydrocarbon radical, X is oxygen or sulfur and R₁ is a hydrocarbon radical. Examples of these preferred compounds are allyl carbamate, allyl thiocarbamate, allyl dithiocarbamate, N-propyl allyl carbamate, N-phenyl allyl carbamate, and N-butyl allyl thiocarbamate.

Of particular value are the amides and polymers derived from the carbamates, thiocarbamates and dithiocarbamates of the formula

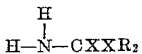

wherein X is an oxygen or sulfur atom and R₂ is an unsaturated hydrocarbon radical containing a polymerizable ethylenic linkage, such as allyl carbamate, allyl thiocarbamate, ethallyl dithiocarbamate, and 2-butenyl carbamate.

Especially preferred carbamate derivatives to be used in producing the novel compounds of the invention are those of the formula

wherein R₃ is an ethylenically unsaturated hydrocarbon radical containing from 1 to 12 carbon atoms.

The novel N-substituted amides of the invention may be obtained by reacting any one of the above-described tertiary alkyl substituted aromatic acids with any one of the aforedescribed amines or carbamate derivatives. Such compounds may be exemplified by N-methallyl p-tert-butylbenzamide, N-allyl 5-tert-butylphthalamide, N-carballoxy 3,5-dinitro-4-tert-octylbenzamide, N-allyl N-carballoxy 3,5-dinitro-4-tert-decylbenzamide, N-butyl N-carballoxy 3-chloro-4-tert-tetradecylbenzamide, N-methallyl N-isobutyl 3-nitro-4-tert-nonylbenzamide, N-octyl N-allyl m-tert-hexylbenzamide, and N-dithiocarballoxy p-tert-butylbenzamide.

The amides derived from the aforedescribed special group of nitro-substituted tertiary alkyl aromatic acids may be illustrated by N-allyl 3-nitro-4-tert-octylbenzamide.

The amides of the invention which are employed in producing the novel polymeric products are those possessing an unsaturated linkage in either or preferably both of the radicals attached directly to the amide nitrogen atom, such as N-allyl p-tert-butylbenzamide, N-methallyl 3,5-dinitro-4-tert-butylbenzamide, N-carballoxy N-allyl p-tert-octylbenzamide, and N-allyl N-methallyl p-tert-hexylbenzamide.

The N-substituted amides of the present invention may be prepared by a variety of methods. They may be prepared, for example, by reacting the tertiary alkyl substituted aromatic acid with the desired amine, carbamate, thiocarbamate or dithiocarbamate, preferably in the presence of a condensing agent, such as phosphorus pentoxide, thionyl chloride or phosgene, or by reacting the acid with the amine to form the salt and then heating the salt to split out water yielding the amide. The compounds prepared from the amines may also be produced by reacting the amine with an acid chloride of the tertiary butyl aromatic acid in the presence of pyridine or other alkaline reaction compounds as quinoline, dimethylaniline, or inorganic bases as Ca(OH)₂. The compounds prepared from the carbamates may also be produced by reacting an amide of the tertiary butyl substituted aromatic acid with the desired ester of chloroformic acid, chloro-thionformic acid, or chloro-dithio-formic acid, in the presence of the aforesaid alkaline reaction compounds.

The proportions of reactants employed in the above-described preparation process may vary over a wide range. It is generally desirable to employ the reactants in approximately stoichiometric quantities, e. g., about one mole of p-tert-butyl-benzoic acid with about one mole of allylamine. Still more preferred proportions are those wherein the amine, carbamate or chloroformate are slightly in excess, e. g., about 1% to 5% excess. An excess of the aromatic acid may be employed but it is preferred to employ the other reactants in excess as they are generally more easily removed from the reaction medium at the completion of the reaction.

The temperature at which the reactions may be carried out will vary as required by the nature of the reacting substances. The preferred temperatures are generally below about 30° C. The reactions proceed particularly smooth when temperatures are between 5° C. and 15° C. The reactions may in some cases proceed at high temperatures, but less contaminating products are obtained and there is less chance of polymerization when the reactions are conducted at the preferred lower temperatures. The lower temperature limit should of course be above the freezing temperature of the reaction mixture. In most cases, the lower temperature limit will be about —25° C. In general, the reactions may be carried out effectively at atmospheric pressures. However, subatmospheric or superatmospheric pressures may be employed if desired or necessary.

As indicated, it is particularly desirable in some cases to carry out the reaction in the presence of a substance to take up the HCl formed in the reaction. Such substances will generally be employed in a slightly greater molar quantity than the chlorine-containing reactant, such as the chloroformate.

Although the reactions may generally be carried out without the addition of solvents or diluents, it may be desirable in some cases to carry out the reactions in the presence of such substances. Suitable solvents and diluents include chloroform, dioxane, benzene, toluene, and the like, and mixtures thereof.

Upon completion of the reactions, the N-substituted amides may be recovered from the reaction mixture by any suitable means, such as filtration, solvent extraction, washing, distillation, and the like.

The reactions may be executed in any convenient type of apparatus enabling intimate contact of the reactants and control of operating conditions. The processes may be carried out in batch, semi-continuous or continuous manner.

The novel N-substituted amides of the invention have definite herbicidal, fungicidal and/or insecticidal properties and may be employed with success as active ingredients in insecticidal, fungicidal and/or herbicidal spray and dust compositions. In such compositions, the new amides may be dissolved in suitable non-corrosive organic solvents, emulsified with water and wetting and dispersing agents, or dispersed in and on finely divided solid carriers, such as diatomaceous earth, bentonite, talc, wood flour, etc. If desired the amides may be employed in combination with pyrethrin- or rotenone-containing extracts or with other organic and inorganic insecticidal toxicants.

The novel N-substituted amides may also be employed in combination with thermoplastic polymers, such as the halogen-containing polymers as poly(vinyl chloride), and cellulose derivatives, as nitrocellulose, where they may act both as a plasticizer and an active pesticidal agent.

As indicated above, the novel N-substituted amides containing a polymerizable unsaturated linkage in the radical or radicals attached to the amino nitrogen atom are able to be polymerized to produce resinous products having good herbicidal and fungicidal properties and improved physical properties. Such products may be used in the preparation of impregnating agents for fibrous material that must remain in contact with the soil for long periods of time, or they may be used in the preparation of coating compositions as lacquers, paints, etc. Films containing these polymers are further characterized by their unexpectedly high degree of hardness and scratch resistance.

The polymerization of the N-substituted amides containing the unsaturated linkage may be accomplished by heating the said compounds in the presence of a suitable polymerization catalyst. The polymerization may be effected in bulk, in the presence of solvents or diluents, or in an aqueous emulsion or suspension. If solvents are employed, they may be solvents for the monomer and polymer, or they may be a solvent for the monomer and non-solvent for the polymer. Examples of solvents that may be utilized are benzene, toluene, cumene, dioxane and the like.

Catalysts suitable for use in the polymerization may be exemplified by benzoyl peroxide, benzoyl acetyl peroxide, tert-butyl hydroperoxide, tert-butyl perbenzoate, hydrogen peroxide, potassium persulfate, and certain Friedel Craft catalysts, such as iron chloride and the like. The amount of the catalyst added may vary over a considerable range. In general, the amount will vary from 0.1% to 5% by weight of the material being polymerized.

The temperature employed in the polymerization may vary over a considerable range depending upon the material being polymerized, catalyst selected, etc. In most cases, the temperature will vary from 50° C. to about 250° C. Preferred temperatures range from 65° C. to 150° C. Atmospheric, superatmospheric or subatmospheric pressures may be utilized.

While extremely valuable products are obtained from the polymerization of the unsaturated N-substituted amides, it is sometimes desirable to copolymerize the said compounds with other polymerizable unsaturated organic compounds, i. e., those containing at least one polymerizable =C=C= group, in order to obtain polymers that may be more desirable for specialized applications. Thus, copolymers which are able to form coatings having outstanding durability as well as increased herbicidal and fungicidal properties may be obtained by copolymerizing the above-described unsaturated N-substituted amides with unsaturated esters of poly-basic acids, preferably those esters derived by the esterification of beta,gamma-monoolefinic monohydric alcohols with organic dicarboxylic acids, such as diallyl phthalate, diallyl succinate, diallyl adipate, methallyl adipate, di-(chloroallyl) phthalate, diallyl oxalate, methallyl malonate, and the like.

Another class of compounds that can be copolymerized with the above-described N-substituted amides include the unsaturated aliphatic polyethers of saturated polyhydric alcohols, such as the divinyl, diallyl and dimethallyl ethers of glycol, diethylene glycol, trimethylene glycol and similar derivatives of diglycerol, manitol, sorbitol, and the like. Another class consists of the unsaturated aliphatic organic acid polyesters of polyhydric alcohols, such as the acrylic and methacrylic polyesters of glycerol or glycol. Still another class consists of the conjugated diolefins, such as butadiene, hexadiene, chlorobutadiene, and the like.

Also of special consideration as materials to be copolymerized with the above-described N-substituted amides in the event the product is to be used for the preparation of rigid plastic articles, are the monomers containing a single polymerizable $CH_2=C=$ group, such as the vinyl aromatic compounds, as styrene, chlorostyrene, alpha-methyl styrene, the vinyl halides, as vinyl chloride, vinyl bromide and vinyl fluoride, the vinylidene halides, such as vinylidene chloride, the ethylenically unsaturated aliphatic nitriles, such as acrylonitrile, and methacrylonitrile, the unsaturated esters of the aliphatic acid esters wherein the ethylenic linkage is in either the alcohol or acid portion of the ester molecule, such as allyl acetate, vinyl acetate, methyl acrylate, butyl methacrylate, ethyl acrylate, allyl acrylate, and the like.

The above-described copolymers may be produced under substantially the same conditions as described above for the polymerization of the N-substituted amides by themselves.

The proportions of the unsaturated N-substituted amides and the other polymerizable compounds with which they are to be copolymerized will vary over a wide range depending upon the specific reactants and the type of products desired. In general, resinous products having the desired degree of pesticidal properties are obtained when the amount of the amide varies within the range 10% to 98% by weight of the total reactants. Resinous products having exceptionally fine properties are obtained when the amount of the amides vary from 25% to 98%. If the products are to be used in the preparation of coating compositions the amides are preferably employed in amounts varying from 30% to 85% by weight of the total reactants. The specific amount of the reactants to be used to bring about the desired properties, however, can readily be determined for each individual case.

The unsaturated N-substituted amides, alone or in combination with other polymerizable components, may also be polymerized in the presence of already-formed plastics, including natural resins, cellulose derivatives and synthetic resins. Other modifiers, including plasticizers, stabilizers, lubricants, dyes, pigments, etc. may also be added before or during the polymerization.

The polymers of the invention may be used to advantage in the preparation of impregnating compositions which are to be used in treating bibulous or fibrous material to impart rigidity thereto or to impart pesticidal properties to the outer surface. The polymers may also be utilized in the preparation of lubricating compositions, paints, varnishes, and as adhesives and plasticizers for various organic compositions. Many of the polymers and copolymers may also be used in the preparation of cast articles, such as plates, rods or cylinders which may be further cut or milled to produce articles of any desired shape or size.

To illustrate the manner in which the invention may be carried out, the following examples are given. It is to be understood, however, that the examples are for the purpose of illustration and the invention is not to be regarded as limited to any of the specific conditions or reactants cited therein. Unless otherwise specified, parts described in the examples are parts by weight.

Example I

About 57 parts of methallylamine, 95 parts of pyridine and 150 parts of benzene were placed in a flask equipped with a stirrer and reflux condenser. The flask was cooled to about 10° C. and a mixture of 289 parts of 3,5-dinitro-4-tert-butylbenzoyl chloride and 158 parts of benzene added thereto. This mixture was heated on the steam bath and allowed to stand overnight. The reactants were then washed with water, dilute hydrochloric acid and then again with water. On removing the benzene, the amide separated as a solid. The product recovered after recrystallization from dilute alcohol had a melting point of 150° C. to 151° C. and was identified as N-methallyl 3,5-dinitro-4-tert-butylbenzamide.

This compound may have high toxic action against weeds and plant insects.

Amides having related properties are obtained by replacing the methallylamine in the above-described process with equivalent amounts of each of the following amines: allylamine, ethallylamine, 2-butenylamine, and 2,5-hexadienylamine.

Example II

To a mixture of 180 parts of p-tert-butylbenzamide, 154 parts of pyridine and 200 parts of chloroform are added about 208 grams of allyl chloroformate in 150 parts of chloroform. The reaction chamber is surrounded by a cooling bath and the addition regulated so that the temperature does not go below 0° C. or above 10° C. When the addition is complete the mixture is allowed to warm to room temperature and stirred overnight. The mixture is then washed as shown in Example I. The resulting product is identified as N-carballoxy p-tert-butylbenzamide.

Amides having related properties are obtained by replacing allyl chloroformate in the above-described process with equivalent amounts of each of the following methallyl chloroformate, 2-butenyl chloroformate, and ethallyl chloroformate.

Example III

About 250 parts of N-methallyl 3,5-dinitro-4-tert-butylbenzamide produced in Example I is mixed with 165 parts of pyridine and 200 parts of chloroform and 210 parts of allyl chloroformate in 150 parts of chloroform slowly added. The reaction mixture is kept at a temperature between about 0° C. and 10° C. When the addition is complete the mixture is allowed to come to room temperature and then stirred overnight. The reaction mixture is then washed as in the preceding examples. The resulting product is identified as N-methallyl N-carballoxy 3,5-dinitro-4-tert-butylbenzamide.

Example IV

About 100 parts of N-methallyl 3,5-dinitro-4-tert-butylbenzamide produced in Example I is mixed with 2 parts of di-tert-butyl peroxide and the mixture heated at 90° C. for a short period. At the end of the heating the mixture is distilled to remove the unreacted monomer and catalyst decomposition product. The resulting product is a soft solid which is compatible with nitrocellulose and has definite pesticidal properties.

A coating composition is prepared by mixing 1 part of nitrocellulose, 1 part of poly(N-methallyl 3,5-dinitro-4-tert-butylbenzamide) and 0.2 part of dibutyl phthalate with a lacquer solvent. Films of this solution cast on steel panels and dried at 80° C. are very hard and flexible and have good resistance to water and outdoor exposure.

*Example V*

The N-methallyl N-carballoxy 3,5-dinitro-4-tert-butylbenzamide produced in Example III is mixed with 2 parts of benzoyl peroxide and heated at 65° C. The resulting product is a very hard solid.

*Example VI*

About 50 parts of N-methallyl 3,5-dinitro-4-tert-butylbenzamide is mixed with about 50 parts of diallyl phthalate and 4 parts of benzoyl peroxide and the resulting mixture heated at 65° C. The resulting product is a hard, inert solid.

Similar copolymers are obtained by substituting equivalent amounts of each of the following esters for diallyl phthalate in the above-described process: diallyl succinate, diallyl adipate, diallyl carbonate, and styrene.

We claim as our invention:

1. N-methallyl 3,5-dinitro-4-tert-butylbenzamide.
2. N-allyl N-carballoxy 3,5-dinitro-4-tert-butylbenzamide.
3. N-carballoxy p-tert-butylbenzamide.
4. A N-alkenyl dinitro-tert-butylbenzamide wherein the alkenyl radical attached to the nitrogen atom contains from 3 to 12 carbon atoms.
5. A N-alkenyl N-carbalkenoxy tert-alkylbenzamide wherein the alkenyl radical attached to the nitrogen atom contains from 3 to 12 carbon atoms, the alkenoxy portion of the carbalkenoxy radical attached to the nitrogen atom contains no more than 12 carbon atoms, and the tert-alkyl radical attached to the benzoic acid portion of the molecule contains from 4 to 12 carbon atoms.
6. A N-alkenyl substituted amide of a nitro-nuclear substituted tert-alkylbenzoic acid wherein the alkenyl radical attached to the nitrogen atom contains from 3 to 12 carbon atoms and the tert-alkyl radical attached to the benzoic acid portion of the molecule contains from 4 to 12 carbon atoms.
7. A N-alkenyl substituted amide of a tertiary alkyl substituted aromatic monocarboxylic acid containing a single six membered aromatic ring, the alkenyl radical attached to the nitrogen atom containing from 3 to 12 carbon atoms and the tertiary alkyl radical attached to the aromatic acid portion of the molecule containing from 4 to 12 carbon atoms.
8. A N-alkenyl N-carbalkenoxy substituted amide of a tertiary alkyl substituted aromatic monocarboxylic acid containing a single six membered aromatic ring, the said N-alkenyl radical attached to the nitrogen atom containing from 3 to 12 carbon atoms, the alkenoxy portion of the carbalkenoxy radical attached to the nitrogen atom containing 12 carbon atoms and the tertiary alkyl radical attached to the aromatic acid portion of the molecule containing from 4 to 12 carbon atoms.
9. A polymer of N-methallyl 3,5-dinitro-4-tert-butylbenzamide.
10. A polymer of N-allyl N-carballoxy 3,5-dinitro-4-tert-butylbenzamide.
11. A copolymer comprising the product of polymerization of a mixture comprising 25% to 98% by weight of N-methallyl 3,5-dinitro-4-tert-butylbenzamide and 2% to 75% by weight of an organic compound containing a single polymerizable ethylenic linkage.
12. A polymer of a N-alkenyl substituted amide of a nitro-nuclear substituted tert-alkylbenzoic acid wherein the alkenyl radical attached to the nitrogen atom contains from 3 to 12 carbon atoms, and the tert-alkyl radical attached to the benzoic acid portion of the molecule contains from 4 to 12 carbon atoms.
13. N-substituted amides of the group consisting of (1) N-alkenyl substituted amides of tertiary alkyl substituted aromatic carboxylic acids containing a single six membered aromatic ring, (2) N-carbalkenoxy substituted amides of tertiary alkyl substituted aromatic carboxylic acids containing a single six membered aromatic ring, and (3) N-alkenyl N-carboalkenoxy substituted amides of tertiary alkyl substituted aromatic carboxylic acids containing a single six membered aromatic ring, the N-alkenyl radicals attached to the nitrogen atom of the above-described compounds containing from 3 to 12 carbon atoms, the alkenoxy portion of the carbalkenoxy radical attached to the nitrogen atom of the above-described compounds containing no more than 12 carbon atoms and the tertiary alkyl radical attached to the aromatic acid portions of the above-described compounds containing from 4 to 12 carbon atoms.
14. A polymer of the N-substituted amides defined in claim 13.

References Cited in the file of this patent

UNITED STATES PATENTS

| Number | Name | Date |
|---|---|---|
| 1,986,854 | Reid | Jan. 8, 1935 |
| 2,166,120 | Bousquet | July 18, 1937 |
| 2,359,332 | Salminen et al. | Oct. 3, 1944 |
| 2,415,356 | Kellog et al. | Feb. 4, 1947 |
| 2,416,522 | Gertler et al. | Feb. 25, 1947 |
| 2,496,882 | Martin et al. | Feb. 7, 1950 |
| 2,551,891 | Martin et al. | May 8, 1951 |
| 2,588,968 | Dickey et al. | Mar. 11, 1952 |

OTHER REFERENCES

Beilstein, Organische Chemie, 4th ed., vol. 9, pp. 560, 561.